United States Patent Office 3,028,374
Patented Apr. 3, 1962

3,028,374
PROCESS FOR THE MANUFACTURE OF
POLYVINYL ALCOHOL
Werner Ehmann and Alfred Kühlkamp, Frankfurt am
Main, Germany, assignors to Farbwerke Hoechst Aktiengesellschaft vormals Meister Lucius & Brüning,
Frankfurt am Main, Germany, a corporation of Germany
No Drawing. Filed Mar. 24, 1959, Ser. No. 801,455
Claims priority, application Germany Mar. 29, 1958
5 Claims. (Cl. 260—91.3)

The present invention relates to a process for the manufacture of solid and filterable polyvinyl alcohol by alcoholysis of polyvinyl esters with alcohols in the presence of water and acid catalysts.

In industry solid polyvinyl alcohol is produced by alcoholysis of polyvinyl esters with alcohols in the presence of alkaline or acid catalysts. In processes performed in an acid medium the polyvinyl ester is heated with the addition of mineral acid in a low aliphatic alcohol, mostly in methanol, and the ester formed is distilled off, if desired. After some hours the polyvinyl alcohol separates in the form of a powder.

These processes involve the disadvantage that an anhydrous polyvinyl ester and an anhydrous alcohol must be used as starting material. High molecular polyvinyl esters having a particularly high degree of polymerization are, however, mostly produced in aqueous suspension in the form of suspension or bead polymers. The drying of said polymers necessitates considerable expenditure of time and high expenses. For this reason processes have been developed for the saponification of wet polyvinyl esters. According to a known process the suspension or emulsion polymer, for example, is heated in aqueous mineral acid with the addition of an aliphatic alcohol or acetic acid as dissolving intermediary. According to another process the saponification is brought about by means of a mixture of aqueous hydrochloric or sulfuric acid and perchloric acid and the carboxylic acid formed is continuously extracted. Said extraction is very expensive. Above all the known processes of this kind yield a polyvinyl alcohol solution. In the solution is always a part or even the whole amount of the acid serving for the decomposition, which acid must be neutralized in the further treatment and is then present in the form of a disturbing salt. Furthermore the polyvinyl alcohol solutions may contain emulsifiers as far as they are obtained from emulsion polymers. Processes which only yield polyvinyl alcohol in the dissolved state involve the further disadvantage that the solutions obtained and particularly the polyvinyl alcohol solutions of high viscosity contain large amounts of water which is not desired in many applications and must be eliminated wholly or partially in the subsequent processing.

Processes in which the polyvinyl alcohol is obtained in solid form enable the separation of the main part of the acids, emulsifiers and other foreign substances by simple filtration whereby said substances are removed with the mother liquor. The remaining polyvinyl alcohol can then be purified additionally by washing. The recovery of the organic solvents from the mother liquor after the separation of the solid polyvinyl alcohol is considerably easier than the recovery from aqueous polyvinyl alcohol solutions.

Now we have found that solid and filterable polyvinyl alcohols can be produced from one or more polyvinyl esters, for example polymers of vinyl acetate, vinyl propionate, vinyl stearate, vinyl benzoate, preferably however polyvinyl acetate, or copolymers of at least two of the aforesaid vinyl esters or copolymers of at least 50 mol percent of the aforesaid vinyl esters and another monomer such as vinyl chloride, crotonic acid, acrylic acid and methacrylic acid and the esters thereof with saturated aliphatic alcohols having 1–4 carbon atoms in a straight or branched chain, by alcoholysis or reesterification with alcohols in the presence of 1–10% of acids, calculated on the weight of the polymer to be saponified, and also in the presence of water when (1) aliphatic saturated alcohols having 3–6 carbon atoms and preferably 4–5 carbon atoms, such as butanol or pentanol are used in the alcoholysis, (2) the quantity of water present in the mixture of alcoholysis varies in the range from 12 to 100% and preferably 20 to 50%, calculated on the polymer, and (3) the alcoholysis is performed at a temperature in the range from 60 to 95° C. Instead of one alcohol it is likewise possible to use mixtures of the aforesaid alcohols. It may be of advantage to dilute the reaction mixture with other organic solvents which are no alcohols, for example with aliphatic or aromatic hydrocarbons, such as gasoline having a boiling range from 50 to 160° C., benzene, toluene, xylene; furthermore with ketones, such as acetone or methylethyl ketone or with esters of lower aliphatic carboxylic acids with lower aliphatic alcohols, for example methyl acetate, isopropyl acetate, butyl acetate or ethyl butyrate.

The polyvinyl alcohols produced by the process of the invention are obtained in powdery or granular form and they are well filterable, colorless or slightly yellowish. The alcoholysis of the invention takes place rapidly and in the reaction vessel minor deposits are formed, if any.

The amount of water advantageously present in the reaction mixture depends on the degree of polymerization of the polymer to be saponified, the temperature of alcoholysis applied and the concentration of the polyvinyl ester in the mixture of alcoholysis. Thus it is of advantage, for example, to use in general only a small amount of water, calculated on the polymer when the polymer to be saponified has a high concentration. The mixture of alcoholysis shall contain in general about 10–50% by weight and preferably 20–40% by weight of the polymer to be saponified and at least the stoichiometric amount of one or several alcohols required for the alcoholysis.

When the content of water is reduced below the limits given above, that is to say below 12%, the alcoholysis requires a prolonged time, the polyvinyl alcohol obtained has a more intense color and contains an increasing amount of water-insoluble constituents. In the absence of water a product is obtained which is insoluble in water and in methanol. When the amount of water present exceeds by far the indicated upper limit of 100%, calculated on the weight of the polymer to be saponified, and amounts, for example, to 150–200% the alcoholysis is either prevented at all or polymers are obtained which are only partially saponified. With an intermediate content of water, i.e. in the range from 100 to 150% a satisfactory alcoholysis takes place, but the polyvinyl alcohol formed is obtained in a swollen state and shows a tendency to form lumps and to adhere to the wall and the stirrer of the vessel.

In the process of the invention it is particularly important to maintain a definite temperature in the course of alcoholysis. When the temperature of alcoholysis is below 60° C. the reaction velocity is too slow.

At higher temperatures, for example above 95° C., the reaction mixture commences to turn yellow or brown and the polyvinyl alcohol formed contains insoluble constituents. To produce colorless polyvinyl alcohols in an industrially interesting reaction period, it is of advantage to perform the alcoholysis in a temperature range from about 65 to 85° C. In order to avoid an agglutination of the polyvinyl alcohol separating from the reaction mixture in a finely divided form it is often recommended to reduce the reaction temperature to 60–70° C. at the end of the alcoholysis.

When the alcohols having 3–6 carbon atoms used in the process of the invention are replaced by short chain alcohols, such as methanol or ethanol, the alcoholysis catalyzed in an acid medium takes place more slowly. The same effect, that is to say a reduction of the reaction velocity, is brought about when alcohols having a higher content of carbon atoms, such as heptanols and the following alcohols, are substituted for the alcohols having 3–6 carbon atoms. In the alcoholysis of polyvinyl esters with methanol or ethanol catalyzed by means of acids only very small amounts of water can be present when solid polyvinyl alcohols are to be produced. When polyvinyl esters are subjected to an alcoholysis with methanol or ethanol in the presence of such amounts of water as used in the process of the invention, the polyvinyl alcohol is either obtained in the form of a solution or of a product which is only partially saponified and swollen and which cannot be filtered.

The process of the invention presents the further advantage that the carboxylic acid forming a constituent of the polyvinyl ester used is transformed into esters which are particularly valuable for the manufacture of lacquers.

In the process of the invention there can be used as starting material suspension (bead) polymers or block polymers. When bead polymers are used that still contain water originating from the manufacturing, it is no longer necessary to dry said bead polymers in contradistinction to the usual processes of alcoholysis. On the contrary further amounts of water may be added whereby organic solvents may be economized. Thus the process presents two advantages, on the one hand the economy of the expenses for the drying and on the other hand an economy of solvents.

The process of the invention is not only limited to pure polyvinyl esters, it is likewise possible to use copolymers containing vinyl esters as components. As acids accelerating the alcoholysis there are particularly suitable strong acids, such as hydrochloric acid, sulfuric acid, benzene-sulfonic acid, toluene-sulfonic acid, naphthalene-sulfonic acids, kogasin-sulfonic acids (i.e. sulfonic acids of saturated aliphatic hydrocarbons of 12 to 16 carbon atoms obtained by the Fischer-Tropsch synthesis), phenyl-kogasin-sulfonic acids (i.e. aliphatic hydrocarbons of 12 to 16 carbon atoms obtained by the Fischer-Tropsch synthesis are reacted with benzene and the alkylation product is transformed into sulfonic acids), etc.

The following examples serve to illustrate the invention but they are not intended to limit it thereto.

*Example 1*

(a) A flask provided with a vigorous stirrer is charged with
300 grams of butanol-(1)
200 grams of polyvinyl acetate (block polymer having a K value of 39, according to Fikentscher as 1% solution in ethyl acetate)
100 grams of water and
8 grams of concentrated sulfuric acid and the mixture is heated to 66° C. After 3¾ hours the polyvinyl alcohol commences to separate. After a reaction period of 7½ hours the polyvinyl alcohol obtained yields a limpid solution in water, contains less than 1.5% of acetyl groups and is well filterable. The filtrate is free from polyvinyl acetate.

In the following two comparative tests the n-butanol-(1) is replaced (b) by an alcohol having an inferior number of carbon atoms (methanol) and (c) by an alcohol having a higher number of carbon atoms (n-octanol-(1).

(b) A mixture of
300 grams of methanol
200 grams of polyvinyl acetate as used in Example 1a
100 grams of water and
8 grams of concentrated sulfuric acid is likewise heated to 66° C. After 10 hours the polyvinyl alcohol commences to separate in the form of swollen lumps. The polyvinyl alcohol obtained after a reaction period of 13 hours still contains 3.5% of residual acetyl groups and can be separated by filtration only with great difficulty. The filtrate still contains unsaponified polyvinyl acetate.

(c) A mixture of
300 grams of n-octanol-(1)
200 grams of polyvinyl acetate as used in Example 1a
100 grams of water and
8 grams of concentrated sulfuric acid is heated to 66° C. After 12 hours the polyvinyl alcohol separates in the form of soft lumps. The polyvinyl alcohol obtained after a reaction period of 16 hours is only partially soluble in water.

When Example 1a is compared with Examples 1b and 1c it becomes evident that the use of butanol yields considerably improved results in contrast with the use of methanol and octanol.

*Example 2*

A flask provided with a vigorous stirrer is charged with
400 grams of i-propanol
100 grams of polyvinyl acetate (bead polymer having a K value of 82)
100 grams of water and
8 grams of concentrated sulfuric acid and the mixture is heated to 78° C. After 12 hours a nearly colorless, granular and well filterable polyvinyl alcohol separates. After a reaction period of 15 hours the polyvinyl alcohol obtained contains less than 1.5% of acetyl groups and yields a limpid solution in water.

*Example 3*

A small enameled vessel provided with an anchor stirrer is charged with
2450 grams of n-butanol-(1)
700 grams of water and
28 grams of concentrated sulfuric acid.

The mixture is heated to 90° C. and 1750 grams of polyvinyl acetate (bead polymer having a K value of 82) are introduced in the course of 2 hours. After 5 hours the polyvinyl alcohol separates in flocculent form. After a reaction period of 12 hours the polyvinyl alcohol obtained can be well filtered. It has a content of acetyl groups of 1.5–2%.

*Example 4*

1 flask provided with a vigorous stirrer is charged with
325 grams of n-pentanol-(1)
100 grams of polyvinyl acetate (bead polymer having a K value of 103)
10 grams of water and
25 grams of hydrochloric acid of 30% strength. After having stirred for 1½ hours at 85° C. the polyvinyl alcohol separates in the form of a coarse powder. After a reaction period of 2 hours the polyvinyl alcohol obtained yields a limpid solution in water.

*Example 5*

A flask provided with a vigorous stirrer is charged with
350 grams of n-butanol-(1)
20 grams of a vinyl acetate/crotonic acid copolymer 95:5, K value 32
50 grams of water and
8 grams of concentrated sulfuric acid and the mixture is heated to 80° C. After 4 hours the polyvinyl alcohol separates in the form of yellowish grains. The polyvinyl alcohol obtained after a reaction period of 7 hours is soluble in water.

Example 6

A small enameled vessel provided with an anchor stirrer is charged with 2.8 kilograms of n-butanol-(1)
2.0 kilograms of polyvinyl acetate (bead polymer having a K value of 103 and containing 20% of water) and
64 grams of concentrated sulfuric acid and the mixture is heated for 3 hours at 82° C. until the polyvinyl alcohol has separated. The temperature is then reduced to 68° C. and the mixture is stirred for another 15 hours. The almost colorless, pulverulent polyvinyl alcohol contains less than 2% of acetyl groups and can be well filtered.

Example 7

A flask provided with a vigorous stirrer is charged with 350 grams of n-butanol-(1)
100 grams of polyvinyl acetate (bead polymer having a K value of 82)
50 grams of water and
4 grams of phenyl-kogasin-sulfonic acid and the mixture is stirred at 85° C. After 6 hours the polyvinyl alcohol separates in the form of lenticular feebly yellowish grains. After a reaction period of 12 hours the polyvinyl alcohol obtained yields a limpid solution in water.

Example 8

A small enameled vessel provided with an anchor stirrer is charged with 1600 grams of n-butanol-(1)
1173 grams of acetone
425 grams of water
102 grams of sulfuric acid and
1700 grams of polyvinyl acetate (bead polymer having a K value of 90) and the mixture is heated for 18 hours to 65° C. A powdery colorless polyvinyl alcohol is obtained which can be well separated by filtration. It yields a limpid solution in hot water.

We claim:

1. A process for the production of solid, filterable polyvinyl alcohol having less than about 2 percent of ester groups therein which comprises alcoholyzing, at a temperature between 60° C.–95° C., a polymer selected from the group consisting of (1) homopolymers of vinyl acetate, vinyl propionate, vinyl stearate, and vinyl benzoate, and (2) copolymers consisting of at least 50 mol percent of a vinyl ester selected from the group consisting of vinyl acetate, vinyl propionate, vinyl stearate, and vinyl benzoate, the balance being a member selected from the group consisting of vinyl chloride, crotonic acid, acrylic acid, methacrylic acid, and acrylic and methacrylic acid esters of saturated aliphatic alcohols having 1 to 4 carbon atoms, in the presence of at least a stoichiometric amount of an aliphatic saturated alcohol having 3–6 carbon atoms, 12–100 percent of water, and 1–10 percent of an acid selected from the group consisting of hydrochloric, sulfuric, aryl sulfonic and saturated aliphatic sulfonic acids, these percentage figures being calculated on the weight of the polymer, the total mixture containing 10–50 percent by weight of said polymer, whereby a solid, filterable polyvinyl alcohol separates from the mixture.

2. A process as in claim 1 wherein said polymer is a vinyl acetate-crotonic acid copolymer.

3. A process as claimed in claim 1, wherein the polyvinyl ester is polyvinyl acetate.

4. A process as claimed in claim 1, wherein the alcoholysis is conducted in the presence of a solvent selected from the group consisting of aliphatic hydrocarbons, aromatic hydrocarbons, aliphatic ketones and esters of aliphatic acids with 1–4 carbon atoms and aliphatic alcohols with 1–4 carbon atoms.

5. A process as claimed in claim 1, wherein the alcoholysis is performed at a temperature within the range of 65–85° C.

References Cited in the file of this patent

UNITED STATES PATENTS

| | | |
|---|---|---|
| 2,227,997 | Berg | Jan. 7, 1941 |
| 2,399,653 | Roland | May 7, 1946 |